United States Patent Office 3,496,151
Patented Feb. 17, 1970

3,496,151
ETHYLENE COPOLYMERS AND A PROCESS FOR THEIR MANUFACTURE
Helmut Korbanka and Hansjörg Vollmann, Hofheim, Taunus, and Max Grossmann, Frankfurt am Main, Germany, assignors to Farbwerke Hoechst Aktiengesellschaft vormals Meister Lucius & Bruning, Frankfurt am Main, Germany, a corporation of Germany
No Drawing. Filed Jan. 17, 1966, Ser. No. 520,857
Claims priority, application Germany, Jan. 23, 1965,
F 45,042
Int. Cl. C08f 15/04
U.S. Cl. 260—79.3                               6 Claims

ABSTRACT OF THE DISCLOSURE

Copolymers of ethylene and vinyl sulfonamide are made by copolymerizing ethylene and vinyl sulfonamide in the presence of a free radical initiator at a temperature of 20° to 250° C. and under a pressure of 10 to 2000 atmospheres.

---

The present invention relates to ethylene copolymers and to a process for their manufacture.

It is known that ethylene can be copolymerized with ethylenically unsaturated compounds, for example vinyl compounds or acrylic compounds. In this process products are obtained which possess properties differing from those of ethylene homopolymers to a greater or lesser extent. Copolymers of this kind have various industrial applications. Thus copolymers of ethylene and vinyl acetate may be used as raw materials for lacquers or varnishes, agents for rendering paraffins flexible, thermoplastic adhesives, coating masses, and the like. Copolymers of ethylene with acrylic esters are suitable, for example, for the manufacture of films and sheets, while products having favorable optical properties are obtained by the copolymerization of ethylene with vinyl ethers. Copolymers of ethylene with vinyl alkyl acetamides have been proposed, inter alia, as interlayers for the manufacture of safety glasses.

Now we have found that copolymers of ethylene with vinyl sulfonamide possess especially advantageous properties for various industrial applications.

The object of the present invention, therefore, is a process for the manufacture of copolymers of ethylene with vinyl compounds according to which ethylene is copolymerized with vinyl sulfonamide in the presence of radical-forming compounds at an elevated pressure, and preferably, at an elevated temperature.

The copolymers according to the invention may comprise of from 0.1% to 99% by weight, calculated on the copolymer, of vinyl sulfonamide. There are suitable for most industrial applications products which comprise of from 1% to 90% by weight, calculated on the copolymer, of vinyl sulfonamide.

According to the invention, the copolymerization of ethylene with vinyl sulfonamide is carried out at pressures above 10 atmospheres gage. At ethylene pressures within the range of from 10 to about 100 atmospheres gage copolymers are obtained with higher vinyl sulfonamide contents, whereas at pressures above 100 atmospheres gage there are mainly obtained products with higher ethylene contents. At pressures within the range of above 1000 to 2000 atmospheres gage, macromolecular plastic-like copolymers are obtained. At pressures within the range of from 100 to 1000 atmospheres gage there can be obtained, depending on the polymerization temperature chosen, products with a low molecular weight having a fatty consistency or a wax-like character, or products of a medium range molecular weight.

The reaction temperature may vary within wide limits. The choice of the reaction temperature depends on the desired properties. When higher reaction temperatures are applied at the same reaction pressure, products with a lower molecular weight are obtained. Moreover, copolymers of the same composition which are obtained at low temperatures possess a higher hardness than those obtained at higher temperatures. The process according to the invention is generally carried out at reaction temperatures within the range of from 20° to 250° C. although it is possible to carry out a copolymerization also outside this range. If the reaction pressure is situated at a pressure above 100 atmospheres gage, it is advantageous to carry out the polymerization within a range of from about 70° to 220° C. whereas at pressures below 100 atmospheres gage it is recommended to apply a polymerization temperature within the range of from 40° to 120° C.

The suitable radical-forming compound (free radical initiator) must be chosen in conformity with the reaction temperature chosen. As free radical initiators all compounds are suitable that form radicals under the polymerization conditions. As free radical initiators there are suitable peroxides, such as dialkyl peroxides, alkyl hydroperoxides, diacyl peroxides, percarbonates and especially azo compounds, preferably azobisisobutyronitrile. Oxygen or oxygen-containing gases may also be used as polymerization catalysts. If the copolymerization is carried out in the presence of water, inorganic free radical initiators such as, for example, alkali metal persulfates, ammonium persulfates or hydrogen peroxide may also be used. The copolymerization can also be carried out in the presence of a redox system.

The copolymerization of ethylene and vinyl sulfonamide according to the invention may be carried out in the presence or in the absence of a solvent. As solvents there are suited, in addition to water, especially organic liquids which do not inhibit the copolymerization, for example aliphatic and aromatic hydrocarbons, halohydrocarbons, alcohols, ethers, esters, ketones, and the like. Especially suitable are solvents which do not exhibit a chain-transferring action, such as benzene, isooctane or tertiary butanol. If the copolymerization is carried out in the presence of water, it is suitable in those cases in which water-insoluble copolymers are formed to carry out the polymerization in the presence of emulsifying or dispersing agents in which case there may possibly be obtained the corresponding copolymer dispersions. In special cases, regulators or chain transferring agents such as hydrogen, propane, butane may be added in the course of the copolymerization.

The copolymerization may be carried out in batches or in a continuous manner. The continuous operation may be carried out not only in an autoclave or in several series-connected autoclaves, but also in a coiled tube.

The copolymers which may be obtained according to the process of the present invention are solid, color- and odor-less products having a wax-like or plastic-like character. The copolymers become more flexible and transparent as the content of vinyl sulfonamide increases. Copolymers with high ethylene contents dissolve, inter alia, in aromatic hydrocarbons and halohydrocarbons, whereas copolymers with higher vinyl sulfonamide contents do not dissolve in aromatic hydrocarbons or dissolve incompletely. However, the copolymers with higher vinyl sulfonamide contents are soluble in polar solvents, such as dimethyl formamide, dimethyl sulfoxide, pyridine, and the like.

A special property of the products obtained according to the invention is their reactivity with alkaline compounds, for example with the hydroxides or carbonates of alkali metals and alkaline earth metals, ammonium hydroxide, and the like. In these reactions reactive compounds having new properties are formed which, in the case of copolymers having higher vinyl sulfonamide contents, are soluble in water. The starting products can be recovered in their original form from the salts by the addition of acids.

The copolymers according to the invention are suitable as additives for improving the dyestuff affinity of polyolefins and polyesters. They are suitable, moreover, as thermoplastic adhesives and as heat-sealable masses, and as additives for improving the bond strength of compositions of thermoplastic adhesives and heat-sealable masses. They may also be used for coating masses and also as dispersion and emulsion auxiliary agents.

The following examples serve to illustrate the invention, but they are not intended to limit it thereto:

EXAMPLE 1

A solution of 40 grams vinylsulfonamide in 300 grams tertiary butanol was introduced into a high-pressure autoclave (capacity: 1 liter), which was provided with a magnetic stirrer. The air contained in the autoclave was then completely displaced by ethylene whereupon the autoclave was heated to 120° C. Ethylene was introduced under a pressure of 500 atmospheres gage, and, by means of a high-pressure proportioning pump, the autoclave was continuously charged with a solution of 1 gram azobisisobutyronitrile in 80 grams tertiary butanol in the course of 3½ hours. A decrease of the pressure and an increase of the temperature indicated that the reaction had started. By abstracting the heat and again forcing in ethylene, the pressure and the temperature were maintained constant throughout the reaction period. The reaction was complete when the total catalyst was consumed and the pressure decreased no longer. The reaction product was drawn off by means of an ascending tube and, after the solvent and possibly unreacted monomers had distilled off, heated in vacuo to a temperature of 150° C. under 1 mm. Hg pressure. There remained 120 grams of a color- and odorless copolymer with a vinyl sulfonamide content of 22% by weight, a density $D_4^{20}$ of 0.955 gram/ml. and a flowing/dropping point according to DIN (German Industrial Standards) 53654 of 114° C./119° C.

EXAMPLE 2

A high-pressure autoclave (capacity: 1 liter) was charged with 100 grams tertiary butanol and heated to 120° C. After the autoclave had been scavenged until free from air, ethylene was forced in under a pressure of 500 atmospheres gage. By means of a high-pressure proportioning pump, the autoclave was charged with a mixture of 200 grams tertiary butanol, 50 grams vinyl sulfonamide and 1 gram azobisisobutyronitrile in the course of 4½ hours. After the reaction product had been worked up in a manner analogous to that described in Example 1, there were obtained 150 grams of a copolymer with a vinyl sulfonamide content of 25% by weight, a density of 0.960 gram/ml., a flowing/dropping point of 112° C./130° C. and a penetration according to DIN (German Industrial Standards) 51579 of 4.0.10⁻¹ mm.

EXAMPLE 3

The reaction was carried out in a manner analogous to that described in Example 2 with the exception that the autoclave was charged by means of a high-pressure proportioning pump with a solution of 100 grams vinyl sulfonamide, 200 grams tertiary butanol and 1 gram azobisisobutyronitrile. A pressure of 500 atmospheres gage and a temperature of 120° C. were maintained throughout the reaction. There were obtained 100 grams of a copolymer with a vinyl sulfonamide content of 34% by weight. The copolymer was not completely soluble in the conventional organic solvents.

EXAMPLE 4

A high-pressure autoclave was charged with 300 ml. benzene. The autoclave was heated to 120° C. and ethylene was forced in under a pressure of 500 atmospheres gage. In the course of 2½ hours, the autoclave was charged by means of a proportioning pump with a mixture of 135 ml. benzene, 15 ml. toluene, 1 gram vinyl sulfonamide and 2 grams azobisisobutyronitrile. The ethylene pressure was maintained constant at 500 atmospheres gage by introducing ethylene so many times that the pressure decreased no longer. After the reaction the reaction product was worked up in a manner analogous to that described in Example 1. 180 grams of a white powder were obtained that had a content of vinyl sulfonamide of 0.5% by weight and a density of 0.935 gram/ml. The reduced specific viscosity measured in a solution of 2% strength by weight in xylene at 85° C., was 0.486.

EXAMPLE 5

A shaking autoclave (capacity: 50 ml.) was charged with a solution of 15 ml. vinyl sulfonamide and 0.3 gram azobisisobutyronitrile in 15 ml. tertiary butanol. The autoclave was heated to 70° C. At the same time an ethylene pressure of 100 atmospheres gage was established. After the reaction had lasted for a period of 14 hours, the pressure had decreased to 60 atmospheres gage. After the work-up, 11 grams of a slight yellowish copolymer were obtained that had a content of vinyl sulfonamide of 79% by weight. The product was practically insoluble in xylene whereas it was substantially soluble in dimethyl formamide. It was, moreover, soluble in a 50% aqueous potassium hydroxide solution.

EXAMPLE 6

A shaking autoclave (capacity: 50 ml.) was charged with 15 ml. vinyl sulfonamide, 15 ml. n-butanol and 0.3 gram azobisisobutyronitrile. Copolymerization was effected at 70° C. under a pressure of 100 atmospheres gage. After a period of 48 hours, the pressure had decreased to 50 atmospheres gage. 17 grams of a copolymer were obtained which was entirely insoluble in methanol. It was extracted with 1 l. of xylene while 16 grams remained behind. The extracted product was dissolved in dimethyl formamide. A stable dispersion was obtained by adding water or methanol to this solution.

EXAMPLE 7

The process was carried out under the same conditions as those described in Example 5 except that the copolymerization was effected under an ethylene pressure of 50 atmospheres gage and at a temperature of 65° C. After a period of 14 hours, the pressure had decreased to 25 atmospheres gage. The substance was removed from the autoclave in the form of a colorless powder and boiled with methanol. 17 grams of a copolymer with a content of 89% by weight of vinyl sulfonamide were obtained.

We claim:
1. A process for the manufacture of ethylene copolymers which comprises copolymerizing from 1 to 99.9% by weight of ethylene, based on the weight of copolymer, and from 0.1 to 99% by weight of vinyl sulfonamide in the presence of a free radical forming compound as catalyst at a temperature in the range of 20° to 250° C. and under a pressure in the range of 10 to 2000 atmospheres.

2. The process of claim 1 wherein ethylene and vinyl sulfonamide are copolymerized at a temperature in the range of 40 to 120° C. and under a pressure in the range of 10 to 100 atmospheres.

3. The process of claim 1 wherein ethylene and vinyl sulfonamide are copolymerized at a temperature in the range of 70 to 220° C. and under a pressure in the range of 100 to 1000 atmospheres.

4. The process of claim 1 wherein ethylene is copolymerized with 1 to 90% by weight, calculated on the copolymer of vinyl sulfonamide.

5. The process of claim 1 wherein ethylene is copolymerized with vinyl sulfonamide in the further presence of a solvent being inert under the conditions of the polymerization.

6. A process for the manufacture of ethylene copolymers which comprises copolymerizing from 1 to 99.9% by weight of ethylene, based on the weight of copolymer, and from 0.1 to 99% by weight of vinyl sulfonamide in the presence of a free radical forming compound as catalyst at a temperature in the range of 20° to 250° C. and under a pressure in the range of 1000 to 2000 atmospheres.

References Cited

UNITED STATES PATENTS

| 2,324,896 | 7/1943 | Zerweck et al. |
| 2,520,917 | 9/1950 | Dickey et al. |
| 2,827,877 | 12/1955 | Park. |
| 2,843,570 | 7/1958 | Coover et al. |
| 3,128,307 | 4/1964 | Zorn et al. |

FOREIGN PATENTS

| 623,422 | 5/1949 | Great Britain. |
| 1,093,991 | 12/1960 | Germany. |

OTHER REFERENCES

Sittig: "Polyolefin Resin Processes," published by Gulf Publishing Co., Houston, Tex., 1961, pp. 70 and 71.

JAMES A. SEIDLECK, Primary Examiner

U.S. Cl. X.R.

260—30.8, 32.6, 897